US008238980B1

(12) United States Patent
Shusterman

(10) Patent No.: US 8,238,980 B1
(45) Date of Patent: Aug. 7, 2012

(54) EFFICIENT UTILIZATION OF MULTIPLE RADIO ACCESS TECHNOLOGIES IN A COMMUNICATIONS DEVICE

(75) Inventor: Alex Shusterman, Vienna, VA (US)

(73) Assignee: Nextel Communications, Inc., Reston, VA (US)

( * ) Notice: Subject to any disclaimer, the term of this patent is extended or adjusted under 35 U.S.C. 154(b) by 1117 days.

(21) Appl. No.: 12/028,703

(22) Filed: Feb. 8, 2008

(51) Int. Cl.
*H04W 4/00* (2009.01)
*H04W 24/00* (2009.01)
*H04M 1/00* (2006.01)
*H04B 1/38* (2006.01)

(52) U.S. Cl. .......... 455/574; 455/435.2; 455/435.3; 455/456.1; 455/432.1

(58) Field of Classification Search ............. 455/432.1, 455/434, 435.1, 435.2, 435.3, 456.1, 456.6, 455/512, 550.1, 552.1, 553.1, 574
See application file for complete search history.

(56) References Cited

U.S. PATENT DOCUMENTS

| 7,437,158 | B2* | 10/2008 | Russell | 455/435.2 |
|---|---|---|---|---|
| 7,848,776 | B2* | 12/2010 | Akiba et al. | 455/552.1 |
| 2003/0119550 | A1* | 6/2003 | Rinne et al. | 455/553 |
| 2007/0207815 | A1* | 9/2007 | Alfano et al. | 455/456.1 |
| 2007/0275717 | A1* | 11/2007 | Edge et al. | 455/434 |
| 2008/0248747 | A1* | 10/2008 | Buckley | 455/39 |
| 2009/0104907 | A1* | 4/2009 | Otting et al. | 455/435.3 |
| 2010/0022243 | A1* | 1/2010 | Oommen et al. | 455/435.3 |

* cited by examiner

*Primary Examiner* — Wesley Kim

(57) ABSTRACT

A communications device, and a method for efficient utilization of multiple radio access technologies in the communications device, is disclosed. The communications device includes a plurality of radios, where each of the plurality of radios is communicable with a respective one of a plurality of radio access technologies. The communications device attempts to extract control channel information from a radio access technology assigned a highest priority in a first geographic area by a radio associated with the highest priority radio access technology in the first geographic area and, if the control channel information for the highest priority radio access technology in the first geographic area is extracted by the radio associated with the highest priority radio access technology in the first geographic area, the communications device does not enable a second radio associated with a second lower priority radio access technology in the first geographic area.

14 Claims, 2 Drawing Sheets

| ACCESS NETWORK PRIORITIZATION TABLE | | | |
| --- | --- | --- | --- |
| PRIORITY | AREA X NETWORKS | AREA Y NETWORKS | • • • |
| 1 | A | D | • |
| 2 | B | B | • |
| 3 | C | A | • |

FIG. 2

EFFICIENT UTILIZATION OF MULTIPLE RADIO ACCESS TECHNOLOGIES IN A COMMUNICATIONS DEVICE

FIELD OF THE INVENTION

The present invention relates generally to the field of telecommunications, and in particular to wireless communications networks.

BACKGROUND OF THE INVENTION

Today, a single mobile communications device may be able to communicate with multiple wireless communications networks via multiple respective radio access technologies. These networks, and associated access technologies, include GSM (Global System for Mobile Communications) and UTRAN (UMTS (Universal Mobile Telecommunications System) Terrestrial Radio Access Network), among others. Whereas the ability to communicate with these different types of networks through these different technologies may provide efficiencies in communicating for a wireless device, inefficiencies may result as well.

Therefore, there is a need for more efficient utilization of multiple radio access technologies, and thus, their associated communications networks, that may be available to a communications device.

SUMMARY OF THE INVENTION

In accordance with an embodiment of a method of the present invention, a method for utilization of multiple radio access technologies in a communications device is provided. An embodiment of the method includes attempting to extract control channel information from a radio access technology assigned a highest priority in a first geographic area by a radio in the communications device associated with the highest priority radio access technology in the first geographic area. If the control channel information for the highest priority radio access technology in the first geographic area is extracted by the radio associated with the highest priority radio access technology in the first geographic area, a second radio in the communications device associated with a second lower priority radio access technology in the first geographic area is not enabled.

In accordance with an embodiment of a communications device of the present invention, the communications device includes a plurality of radios, where each of the plurality of radios is communicable with a respective one of a plurality of radio access technologies. The communications device attempts to extract control channel information from a radio access technology assigned a highest priority in a first geographic area by a radio associated with the highest priority radio access technology in the first geographic area and, if the control channel information for the highest priority radio access technology in the first geographic area is extracted by the radio associated with the highest priority radio access technology in the first geographic area, the communications device does not enable a second radio associated with a second lower priority radio access technology in the first geographic area.

BRIEF DESCRIPTION OF THE DRAWINGS

FIG. 2 illustrates an access network prioritization table of the communications device in accordance with the principles of the present invention.

DETAILED DESCRIPTION OF THE EXEMPLARY EMBODIMENTS

Figure 1:
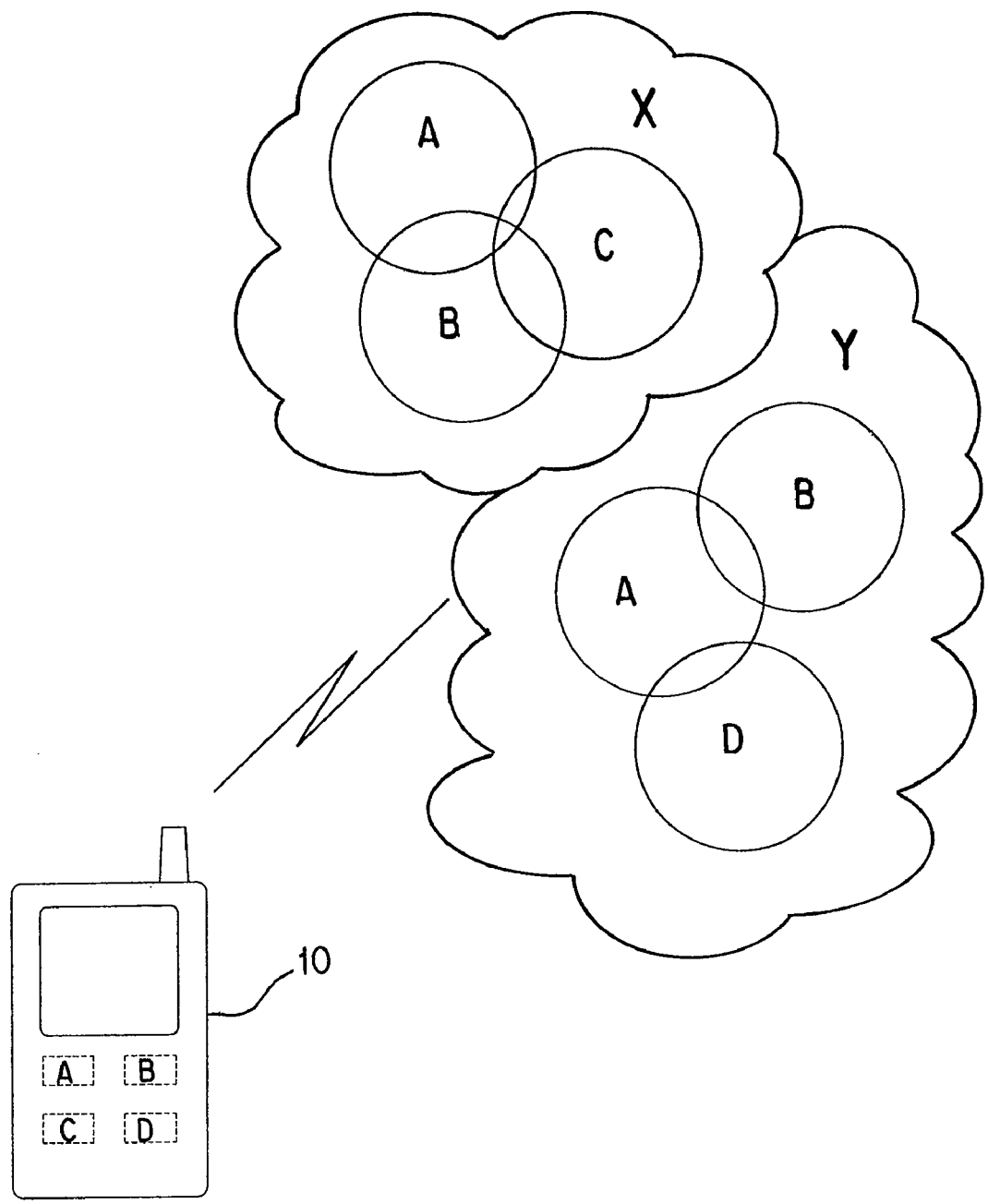
FIG. 1 illustrates a mobile communications device that is able to communicate with a variety of communications networks in any particular geographic area in accordance with the principles of the present invention.

FIG. 1 illustrates a mobile communications device 10 that is able to communicate with a variety of communications networks in any particular geographic area, where a different respective technology, and thus a different respective access technology, is utilized when the device communicates with each of these networks. For example, in geographic area X, which may be a city, county, etc., communications device 10 is able to communicate with networks A, B, and C, which each utilize a different technology. Similarly, device 10 is able to communicate in geographic area Y with networks A, B, and D, where again, each of the networks utilize a different technology. Thus, device 10 must include multiple radios, e.g., radios A, B, C, and D, where each of these radios utilize one of the technologies of the networks for communicating with the networks.

The mobile device 10 monitors the control channels within an access technology to determine numerous details of the access network, e.g., networks A, B, C, or D. For example, the control channels of any particular radio access technology provides cell site identities, frequencies available, access timing details, etc. As discussed above, in order for the mobile device 10 to monitor each of the access networks in any particular geographic area, the associated radios of the device 10 must be powered-up. Each of these radios within the device 10 actively performs similar tasks for each network to extract this detail for the respective network. This may not be efficient since, in any given geographic area, only one access technology may be available, or optimal, for use the bulk of the time that the device 10 is in the area. This may be due to, for example, limited pedestrian and vehicle mobility, etc.

In accordance with the principles of the present invention, the device 10 assigns a priority to each of the access networks in any particular geographic area and, responsively, provides power to the radios of the device 10 in accordance with this prioritization. The prioritization may be based on the likelihood that the device will be able to communicate in that geographic area on each access network. For example, in geographic area X, based on any number of factors, e.g., signal strength, available channels, location within the area, etc., it is determined that the device 10 is most likely to be able to communicate via network A and least likely to be able to communicate via network C. Therefore, a prioritization is established by the device 10 for each of the networks in each of the geographic areas. As can be seen in FIG. 2, an Access Network Prioritization Table is maintained in device 10 for different geographic areas and the access networks within these areas.

As discussed above, device 10 provides power to the radios of the device 10 in accordance with this prioritization. For example, in area X, since it is most likely that device 10 will be able to communicate via network A, device 10 powers-up the radio within the device that is associated with the network A technology. In an embodiment, none of the radios associated with the less likely networks are powered-up. Thus, this conserves the battery power of the device 10 since the battery is only required to power-up one of the radios, rather than having all of the radios powered-up by the device. It may be more efficient to only power-up the radio associated with the highest priority access network since it is unlikely that the lesser priority networks will be utilized over the highest priority network. Thus, it may be inefficient to provide power to the radios associated with these lesser priority networks.

Of course, there may be reasons why it may be desirable to provide power to radios in addition to just the radio associated with the highest priority access network, or even to provide power to a radio(s) other than that associated with the highest priority network. However, in accordance with the principles of the present invention, power is provided to a radio, or radios, in accordance with a prioritization scheme associated with a geographic area.

As discussed above, the mobile communications device 10 itself may keep and assign a prioritization to each access network in a geographic area. The device can assign the priorities based on historical data stored in a database in the device associated with prior communications in the geographic area. The device is able to determine its location based on, for example, GPS information available to the device. Alternatively, the device can initially power-up all of its radios in a geographic area such that the radios can monitor the control channels of the access networks. Based on the information received in the control channels, the device can then prioritize each access network and power-down one or more radios in accordance with the assigned prioritizations. Then, as the device moves within the geographic area, or amongst different geographic areas, the device can power-up or down radios, as appropriate, in accordance with the prioritization scheme(s).

Alternatively, in lieu of the device determining the prioritization scheme, one or more of the access networks may provide the prioritization information to the device. For example, the networks know the location of the device through GPS, etc., and, based on this location information, provide priority information to the device with respect to the available networks in the geographic area. The networks are able to determine information for each network, relative to each other network, based on network monitoring functionality in the networks, e.g., similar to the device's monitoring capabilities with its radios. Thus, in this embodiment, the prioritization list is modified by the network(s), e.g., network(s) operators. The operator, for example, can send updates to refresh the prioritization list over the airwaves, e.g., by sms, mms or any other over-the-air download manager. This embodiment could conserve, or reduce, the computing requirements of the communications device.

In an embodiment, the device would not implement a power-saving mode with respect to its radios until a defined battery level is reached. For example, when the battery has a full charge, the device could monitor all networks within the geographic area with its radios. Thus, all radios would be powered-up. This may be desirable since, because the battery is fully charged, there is not a need to conserve battery power. In this embodiment, once the battery power reached a certain defined level, e.g., 50%, then the powering of the radios in accordance with the prioritization scheme would be implemented. Thus, the present invention considers the trade-off between remaining battery life and access network monitoring when determining when to implement the prioritization scheme of the present invention.

In a use scenario of the present invention, in a multiple access deployment of the mobile device, the mobile could possess a priority list that is ordered in such a way where the top priority access network is the most likely radio technology to be present when the mobile is initially powered on. Once the mobile is powered on the mobile will attempt to extract the control channel information from the highest priority access network. Failure to identify and attach to the highest priority radio network will initiate an attempt to identify and attach to the second highest priority network. The procedure continues and potentially repeats until an available network is identified and attached to or service unavailable is indicated on the mobile device.

Assuming that the mobile has identified and attached to a network within its priority list, only the associated radio is active within the mobile device. No other radio is active in the mobile device until the radio experiences such conditions that it no longer can handover onto a cell of the same access technology as the active radio. Upon experiencing such a condition, the mobile device can turn on the highest priority access network that is currently in the inactive (off) state and attempt to attach to that access network. Successful identification and attachment to that network will potentially allow any active sessions to be moved to the newly attached network and detaching from the prior active network. Once the active session has moved to the new network, or the session is dropped because seamless mobility is not supported, the prior active access radio can be deactivated. In instances where the mobile device was not in an active session, once the mobile attaches to the new access network, the prior access network radio can simply be deactivated. Similarly to the initial power on procedure, the priority list is followed from the highest to the lowest access network to determine an available access network, with the exception of the currently active access network.

Although in an embodiment the priority list, as discussed above, is a fixed list, in an alternative embodiment a database of lists is collected with the order of the lists being dynamically adjusted based on the identity or set of identities of networks within a given region. For example, a device capable of accessing three networks (A, B, and C) may have a base ordered list of access technologies A, B, C for regions X and Y, where regions X and Y support all available access technologies (A, B, and C). The same device, after a number of visits to region Y and having traversed the list only to consistently move from access technology A to C and almost never to B, would dynamically reorder the access technologies list for region Y to now have the order of A, C, and B. The device maintains a database of lists for all visited regions.

In a further embodiment, multiple networks may be owned by one or more operators. The priority list could then be generated to avoid roaming unless own network conditions are so poor that own networks cannot offer service, or the geographic area is a known roaming area and the list contains roaming network(s) only.

Therefore, by utilizing the principles of the present invention, only the radio that is necessary for providing wireless services can be activated. Alternatively, multiple radios can be concurrently activated for only brief periods of time. Since it is very power resource consuming to operate two or more radios within a mobile device due to the limitations of the battery power capacity, battery power can be conserved with the present invention. The method and apparatus of the present invention can provide for, among other benefits, 1) conserving the limited battery resources of the mobile device; and 2) offering mobility between the dissimilar access technologies.

By utilizing the Access Network Prioritization Table of the present invention, a priority list is traversed to activate an appropriate radio access technology(s). In an embodiment, a second radio access technology is activated only when conditions on the active radio access technology are reaching to the unavailable state. The no-longer-necessary radio access technology is then deactivated. A dynamic database of priority lists by regions can be provided to provide faster transitions to the next available access technology.

The disclosed embodiments are illustrative of the various ways in which the present invention may be practiced. Other embodiments can be implemented by those skilled in the art without departing from the spirit and scope of the present invention.

What is claimed is:

1. A method for utilization of multiple radio access technologies in a communications device, comprising the steps of:
    generating a dynamic prioritization list assigning a highest priority and a second lower priority to radio access technologies based on a location of the communications device in a first geographic area;
    powering down a second radio in the communications device associated with the second lower priority radio access technology in the first geographic area when a defined battery level is reached for a battery of the communications device;
    attempting based on the prioritization list to extract control channel information comprising cell site identities, frequencies available, and access timing details from a radio access technology assigned the highest priority by a radio in the communications device associated with the highest priority radio access technology in the first geographic area,
    wherein the highest priority is assigned to the radio access technology dynamically based on a network identity of the radio access technology in the first geographic area to avoid roaming to a roaming network, and
    if the control channel information for the highest priority radio access technology in the first geographic area is extracted by the radio associated with the highest priority radio access technology in the first geographic area, maintaining the powered down state of the second radio in the communications device.

2. The method according to claim 1, further comprising the steps of:
    if the control channel information for the highest priority radio access technology in the first geographic area is not extracted by the radio associated with the highest priority radio access technology in the first geographic area, attempting to extract control channel information from the second lower priority radio access technology in the first geographic area by the second radio associated with the second highest priority radio access technology in the first geographic area and powering down the radio associated with the highest priority radio access technology in the first geographic area.

3. The method according to claim 1, further comprising the steps of:
    entering a second geographic area separate from the first geographic area by the communications device;
    generating a dynamic prioritization list assigning a highest priority and a second lower priority to radio access technologies based on the location of the communications device in the second geographic area;
    attempting based on the prioritization list to extract control channel information from the radio access technology assigned a highest priority in the second geographic area by a radio in the communications device associated with the highest priority radio access technology in the second geographic area; and
    if the control channel information for the highest priority radio access technology in the second geographic area is extracted by the radio associated with the highest priority radio access technology in the second geographic area, maintaining the powered down state of a second radio in the communications device associated with a second lower priority radio access technology in the second geographic area.

4. The method according to claim 3, further comprising the steps of:
    if the control channel information for the highest priority radio access technology in the second geographic area is not extracted by the radio associated with the highest priority radio access technology in the second geographic area, attempting to extract control channel information from the second lower priority radio access technology in the second geographic area by the second radio associated with the second highest priority radio access technology in the second geographic area and powering down the radio associated with the highest priority radio access technology in the second geographic area.

5. The method according to claim 3, further comprising the step of powering down the radio in the communications device associated with the highest priority radio access technology in the first geographic area.

6. The method according to claim 1, further comprising the step of assigning the highest priority to a radio access technology in the first geographic area by the communications device based on historical data stored in a database in the communications device associated with prior communications in the first geographic area by the communications device.

7. The method according to claim 6, further comprising the step of maintaining the dynamic prioritization list in the communications device.

8. A communications device, comprising:
    a plurality of radios, wherein each of the plurality of radios is communicable with a respective one of a plurality of radio access technologies;
    wherein the communications device generates a dynamic prioritization list assigning a highest priority and a second lower priority to radio access technologies based on a location of the communications device in a first geographic area,
    wherein a second radio in the communications device associated with the second lower priority radio access technology in the first geographic area is powered down when a defined battery level is reached for a battery of the communications device;
    wherein the communications device attempts based on the prioritization list to extract control channel information comprising cell site identities, frequencies available, and access timing details from a radio access technology assigned the highest priority by a radio associated with the highest priority radio access technology in the first geographic area,
    wherein the communications device dynamically assigns the highest priority to a radio access technology in the first geographic area to avoid roaming to a roaming network, and
    if the control channel information for the highest priority radio access technology in the first geographic area is extracted by the radio associated with the highest priority radio access technology in the first geographic area, the communications device maintains the powered down state of the second radio associated with a second lower priority radio access technology in the first geographic area.

9. The communications device according to claim 8, wherein if the control channel information for the highest priority radio access technology in the first geographic area is not extracted by the radio associated with the highest priority radio access technology in the first geographic area, the communications device attempts to extract control channel information from the second lower priority radio access technology in the first geographic area by the second radio associated with the second highest priority radio access technology in the first geographic area and powers down the radio associated with the highest priority radio access technology in the first geographic area.

10. The communications device according to claim 8, wherein when the communications device enters a second geographic area separate from the first geographic area,
the communications device generates a dynamic prioritization list assigning a highest priority and a second lower priority to radio access technologies based on the location of the communications device in the second geographic area;
the communications device attempts based on the prioritization list to extract control channel information from the radio access technology assigned a highest priority in the second geographic area by a radio in the communications device associated with the highest priority radio access technology in the second geographic area; and
if the control channel information for the highest priority radio access technology in the second geographic area is extracted by the radio associated with the highest priority radio access technology in the second geographic area, the communications device maintains the powered down state of a second radio in the communications device associated with a second lower priority radio access technology in the second geographic area.

11. The communications device according to claim 10, wherein if the control channel information for the highest priority radio access technology in the second geographic area is not extracted by the radio associated with the highest priority radio access technology in the second geographic area, the communications device attempts to extract control channel information from the second lower priority radio access technology in the second geographic area by the second radio associated with the second highest priority radio access technology in the second geographic area and powers down the radio associated with the highest priority radio access technology in the second geographic area.

12. The communications device according to claim 10, wherein the communications device powers down the radio in the communications device associated with the highest priority radio access technology in the first geographic area.

13. The communications device according to claim 8, wherein the communications device assigns the highest priority to a radio access technology in the first geographic area based on historical data stored in a database in the communications device associated with prior communications in the first geographic area by the communications device.

14. The communications device according to claim 13, further comprising an access network prioritization table stored in the communications device and
wherein the dynamic prioritization list of the plurality of radio access technologies is stored in the access network prioritization table.

\* \* \* \* \*